Sept. 7, 1926.
E. E. RICHARDSON
1,598,621
HEADLIGHT
Filed Sept. 12, 1924    2 Sheets-Sheet 1
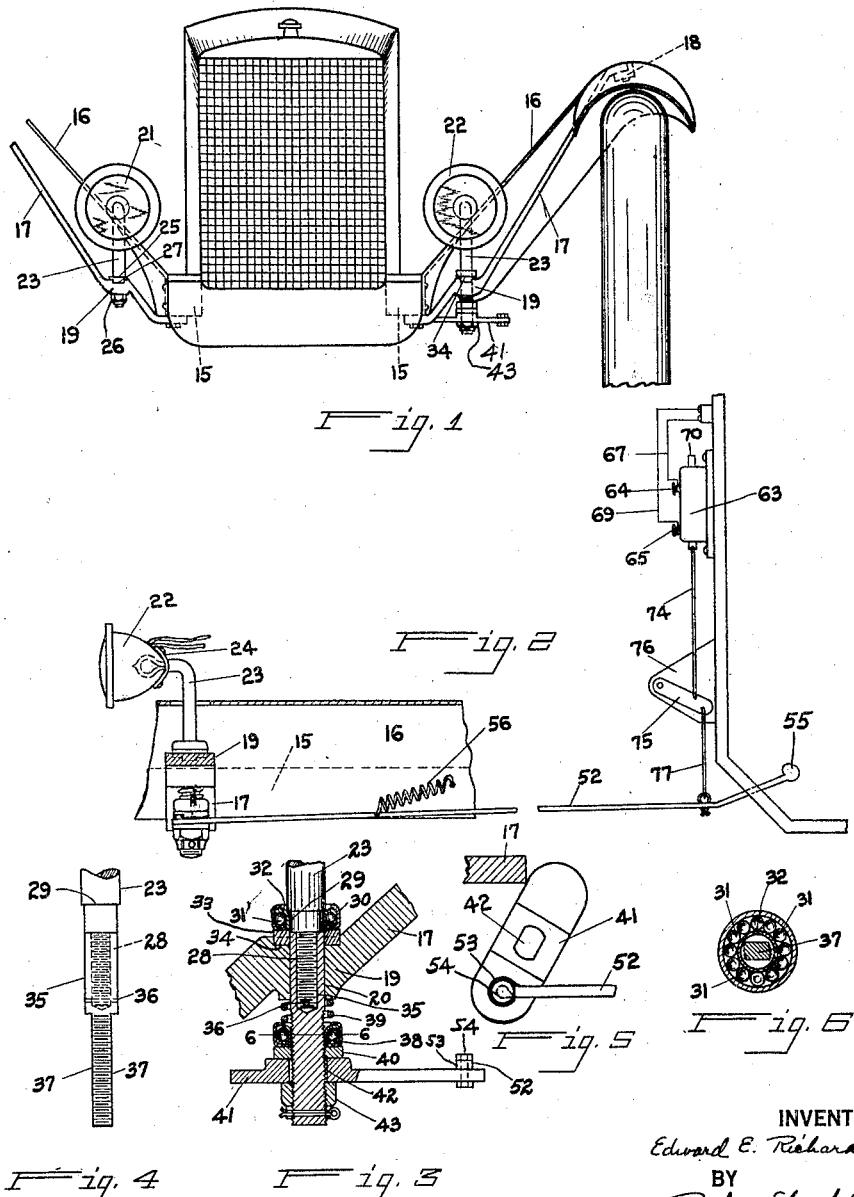
INVENTOR
Edward E. Richardson
BY
Richey, Slough & Watts.
ATTORNEYS.

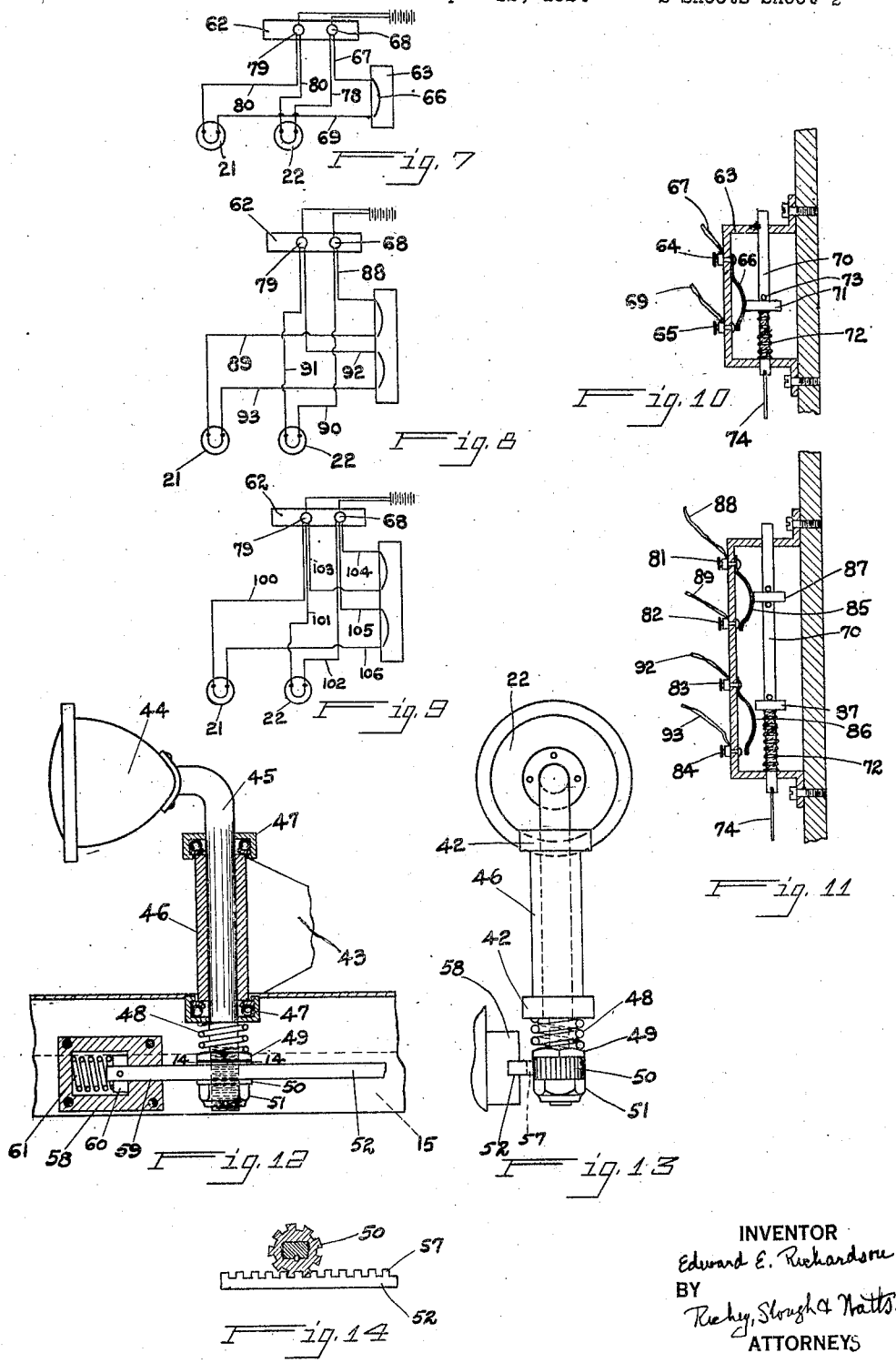

Patented Sept. 7, 1926.

1,598,621

UNITED STATES PATENT OFFICE.

EDWARD E. RICHARDSON, OF MAUMEE, OHIO.

HEADLIGHT.

Application filed September 12, 1924. Serial No. 737,293.

It is well known that the volume of light necessary to illuminate the road for driving automobiles at night is of such a character that it blinds the driver of a vehicle passing in the opposite direction and that various means of overcoming this condition are in use. It is usually compulsory that the drivers of vehicles approaching each other dim their lights, and when dimmed so that there is no glare, the light projected is insufficient to drive with safety. A spotlight is usually employed to assist in illuminating the road when the lights are dimmed, and such light is usually mounted in a plane above the headlights and directs a spot of light which is adjusted to play on the edge of the road. The entire beams of the headlights now in use are not projected the same distance in advance of the vehicle when adjusted to prevent blinding the driver of a vehicle passing in the opposite direction, and it is more essential that the road be sufficiently illuminated just as far in advance when passing another vehicle, as when the road is clear.

An object of my invention is to provide a headlight which can be adjusted so that its rays can be thrown out of the line of the vision of the driver of a passing machine and which will illuminate the road the same distance in advance of a machine regardless of its adjustment.

Another object of my invention is to provide mechanism which can be operated by the driver of a car to adjust the left headlight to direct the full rays therefrom to one side of the road and at the same time control the volume of light projected by the right headlight.

These and other objects and the invention itself will appear in the following specification.

In the accompanying drawings—

Fig. 1 is a front elevation of an automobile with my invention applied thereto;

Fig. 2 is a side elevation of the same with the fender broken away;

Fig. 3 is a sectional view of the mounting of the lamp carrying bracket;

Fig. 4 is a fragmentary elevation of the lamp bracket stem with the sleeve attached thereto;

Fig. 5 is a plan view of the plate for swiveling the bracket with the operating rod attached thereto;

Fig. 6 is a sectional view taken on line 6—6 of Fig. 3;

Fig. 7 is a diagrammatical view of a system of circuits for the lamps;

Fig. 8 is a diagrammatical view of another system of circuits for the front lamps;

Fig. 9 is a diagrammatical view of another system of circuits for the front lamps;

Fig. 10 is a sectional view of a switch used in the circuit shown in Fig. 7;

Fig. 11 is a sectional view of a switch used in the circuits shown in Figs. 8 and 9;

Fig. 12 is a vertical sectional view of a standard equipment with my invention applied thereto;

Fig. 13 is a side elevation of the same; and

Fig. 14 is a sectional view of the rack and pinion taken on line 14—14 of Fig. 12.

Referring to the drawings by characters of reference, 15 represents the side sills of an automobile frame to which the front wheel fenders 16 are secured in a conventional manner. Brace rods 17 are secured to the underside of the side sills, adjacent the front end of the fenders, and extend substantially transversely beneath the underside thereof. The outer end of the brace rods are secured to the outer portion of the fenders by brackets 18, and serve to support the same. A central portion 19 of the brace rods extends in a horizontal plane and each are provided with an aperture 20, providing a support for the headlamps.

The headlamps 21 and 22 are provided with supporting stems 23, extending from brackets 24 which are riveted to the rear of the lamp casings. With the exception of Figs. 11 and 12, I have illustrated my invention applied to a "Ford" automobile, and in such an automobile both of the headlamps are usually arranged with the stems extending through the apertures 20 in the brace rods where they are rigidly secured, in the same manner as the headlamp 21. The end of the stem 23 of the headlamp 21 is threaded, and a nut 25 is screwed upon the stem to support it upon the brace rod at the desired height, and a castellated nut 26 is screwed upon the end of the stem and engages the underside of the brace rod. The nut 25 is provided with a shoulder 27 which fits into a recess in the top of the brace rod adjacent the aperture 20, thereby preventing the stem 23 from turning.

The purpose of my invention is to mount the headlight 22, which is next to machines passing in the opposite direction, so that its beams can be thrown forwardly substantially the same distance as when rigidly mounted, and out of the vision of the driver of a machine passing in the opposite direction. Such actuation of the headlamp can be accomplished by various mechanism which can either be applied as standard construction, or can be arranged to be applied to automobiles in which the lamps are stationary. In the latter case with the type of automobile illustrated, the lamp 22 with its stem 23 is removed from the aperture 20. A ball bearing is placed upon the reduced portion 28 of the stem adjacent the shoulder 29 and consists of an apertured cup 30, within which balls 31 are retained by a cone 32, the cup having an inwardly extending top flange to retain the cone therein. A washer 33 is placed on the stem and is provided with a shoulder 34 which fits into a recess in the top of the brace rod. This washer provides a support for the ball bearing which in turn supports the stem 23 of the lamp 22. A sleeve 35 is provided with a threaded base at its upper end which is arranged to be screwed upon the threaded end 28 of the stem 23 of lamp 22, when the stem 23 is projected through the aperture 20 in the brace rod. The sleeve is rotatably mounted within the aperture 20 in the brace rod when screwed upon the stem 20, and its upper end will lie adjacent the upper ball bearing, but is spaced therefrom so that it will not bind, the washer 33 having an aperture therethrough of sufficient diameter to permit the sleeve to extend in such relation. A key 36 extends transversely through apertures in the stem 28 and the sleeve, thereby securing them rigidly together.

The outer lower end of the sleeve is threaded and provided with flat sides 37. A ball bearing 38, of the same construction as that previously described, is placed upon the threaded end of the sleeve and a coil spring 39 surrounds the sleeve and bears against the bottom of the brace rod and the ball bearing 38. A nut 40 is screwed upon the threaded end of the sleeve and bears against the ball bearing 38, the adjustment of said nut determining the tension of the spring 39. It will be seen that the lamp 22 and its stem 23 can rotate in a horizontal plane, and that the ball bearings permit the same to be readily rotated. The spring is under sufficient tension to maintain the lamp stem in a vertical relation with the brace rod, so that it will not be subjected to an ordinary vibration. A plate 41 is provided with a slot 42 of the same shape as the threaded end of sleeve 35, and is placed thereon and secured against the nut 40 by a castellated nut 43. It will be seen that rotation of the plate 41 will cause the sleeve and lamp stem to rotate in a horizontal plane relative to the brace rod. With such construction very little change needs to be made in the standard construction, for the lamp 22 to be arranged to swivel in a horizontal plane.

In Figs. 11, 12 and 13, I have shown a lamp which is mounted to swing in a similar manner, as that just described, and such lamp can be produced as standard construction, rather than as an adaptation. In this form the lamp 44 and the stem 45 are substantially the same as the lamp 21 and stem 23 described above, while the support therefor is a sleeve 46 which is standard equipment on many automobiles. A ball bearing 47 is provided at each end of the sleeve, through which the stem 45 extends. A coil spring 48 surrounds the stem beneath the sleeve and bears against the lower ball bearing and against a nut 49 which is threaded on the stem for the same purpose as the nut 40 above described. The stem 45 is threaded at its lower end and provided with flat sides similar to the end 37 of the sleeve described above. A gear 50 is secured upon the stem 45 beneath the nut 49 and a castellated nut 51 secures the gear against the nut 49.

An operating rod 52 is provided at one end with an eye 53 which is secured to the outer end of the plate 41 by a bolt 54. The other end of this rod extends through the floor board of the automobile and is provided with pedal 55 at its end which is located so that it can readily be pressed forwardly by the driver. A spring 56 is secured at one end to the rod 52 and at its other end to the automobile frame. This spring is arranged to return the rod to a position in which the lamp will direct its beams directly in front of the automobile. The plate 41 is so arranged with the stem 23 that its inner end will engage the rear side of the lower portion of the brace rod as shown in Fig. 5 to prevent the lamp from turning to the left of a position in which the beams are directed straight ahead. It will thus be seen that the lamp is turned to the right to a desired degree which is regulated by the forward movement of the rod 52. The plate 41 could be rotated in a similar manner by hand operated levers if so desired.

In Figs. 12, 13 and 14 the forward end of the rod 52 is provided with teeth 57 which are arranged to engage the gear 50, which is secured to the lamp stem. It will be seen that a forward movement of the rod will turn the lamp to the right, thereby moving it in a horizontal plane when the operator presses forwardly on the pedal 55. In this modified form of operation a casing 58 is secured to the vehicle frame and is provided with an aperture 59, which provides a bearing for the forward end of the rod 52. A washer 60 is secured to the end of the rod within the casing, and a spring 61 bears thereagainst to normally return the rod to its rear position, in which position the lamp will point directly forwardly of the vehicle.

I find that it is desirable to control the beams of the light thrown by the incandescent lamp 21, to prevent the glare therefrom from blinding a driver of a machine passing in the opposite direction, and I regulate the same automatically by the operation of the mechanism for swiveling the left headlamp.

In Figs. 7 and 10 is illustrated an electric circuit and a switch employed therewith, whereby the circuit passing to the lamp 21 is broken when the mechanism for swiveling the lamp 22 is operated. The usual terminal plate 62 for the electric wires is secured to the dash of the automobile, and a switch casing 63 is secured therebeneath. A pair of terminals 64 and 65 are secured to and extend within the casing. A curved leaf spring contact member 66 is secured at one end to the terminal 64 and the other end thereof extends normally in spaced relation over the terminal 65. A wire 67 leads from the terminal post 68 on the terminal 62 and is secured to the terminal 64, while a wire 69 is secured to the terminal 65 and leads to the incandescent lamp of the headlamp 21. A plunger 70 extends through aligned apertures in the switch casing, and a washer 71 is carried by the plunger. A coil spring 72 surrounds the plunger intermediate the washer and the casing, and a pin 73 extends through the plunger to limit the upward movement of the washer upon the plunger. The washer is of such size that it engages the contact member when the plunger is in normal position, forcing it into engagement with the terminal 65 and thereby providing a circuit to energize the lamp with which the wire 69 is connected. This contact member is released when the plunger is moved downwardly, thereby breaking the circuit to lamp 21.

A wire 74 is secured to the lower end of the plunger and is secured to a lever 75 which is pivoted to a bracket 76 secured to the dash. Another wire 77 extends from the lever 75 and is attached to the rod 52. When the rod 52 is in normal position, the spring 72 will place the washer 71 in position to press the contact member against the terminal 65, in which relation both lamps are energized producing bright lights. When the rod 52 is pressed forward to swivel the lamp 22, it will pull the wires 74 and 77 downwardly, causing the plunger and washer to move downwardly, releasing the contact member 66 from the terminal 65 and thereby breaking the circuit leading to the right lamp 21. With this arrangement the light in lamp 21 is controlled simultaneously with the movement of the rod 52 to swivel the lamp 22. A wire 78 extends to the lamp 22 from the terminal 68, for providing a bright light, and wires 80 extend to both lamps from the terminal 79, to provide a dim light, and such lights are not affected by the operation of the switch. It will be understood that all of the headlamps herein described are provided with a double filament with which the bright and dim wires are connected.

In Figs. 8 and 11 I have illustrated a system in which both the dim and bright light circuits leading to the lamp 21 may be controlled by the operation of a rod 52. In such a system the switch box is provided with two pair of terminals 81 and 82, and 83 and 84, and a pair of curved contact members 85 and 86 are secured to the terminals 81 and 83 respectively, and are normally spaced above the terminals 82 and 84. The rod 70 is provided with a pair of washers 87 which are secured therewith to cause one of the contact members to connect one pair of terminals when the other pair are disconnected.

A wire 88 connects the terminal 68 with the terminal 81, and a wire 89 connects the terminal 82 with the lamp 21. The terminal 68 is energized by the battery and the circuit is established when the contact member 85 engages the terminal 82 to provide a bright light in the lamp 21. A wire 90 leads directly from the terminal 68 to the lamp 22 to provide a bright light. A wire 91 extends from the terminal 79 to lamp 22 to provide a dim light, and a wire 92 extends from the terminal 79 to the post 83. A wire 93 extends from the post 84 to the lamp 21, to provide a dim light when the contact member 86 engages the post 84. As shown in Fig. 11, when the plunger is maintained in normal position by the spring 72 the contact member 85 will engage the post 82 providing a bright light in lamp 21. When the plunger is moved downwardly by the wires 74 and 77 through the movement of rod 52 turning the lamp 22, the contact member 85 is released from the post 82 and the contact member 86 is caused to engage the post 84 by the pressure of the lower washer 87 thereagainst, thus breaking the bright light circuit to lamp 21 and establishing the dim light circuit thereto. With this system the right headlight will be automatically dimmed when the left headlight is turned.

In Fig. 9 I have illustrated a circuit which can be used in conjunction with the switch shown in Fig. 11, it being understood that the usual dash switch can be applied to establish bright or dim headlights as desired. In this circuit a wire 100 leads from the terminal 79 to the headlamp 21 to provide a dim light circuit, and a wire 101 also leads from this terminal to the headlamp 22 to establish a dim light circuit. A wire 102 extends from the terminal 68 to the lamp 22 to establish a bright light circuit, and a wire 103 extends from the terminal 79 to the post 82. A wire 104 extends from the post 81 to the terminal 68, and a wire 105 leads from the post 68 to the terminal 83, while a wire 106 leads from the post 84 to the lamp 21. When the terminals 83 and 84 are closed by the plunger, when in normal position, a bright light is provided in the lamp 21. The dim lights in both lamps and the bright light in lamp 22 are established directly from the terminals 79 and 68. With this system when the dim light circuits are established by the dash switch, the bright light in lamp 22 will be energized when the contact member 85 engages the post 82, as the current from the post 79 will pass through wires 103 and 104 through the wire 102, thereby establishing both the dim and bright light circuits in lamp 22. The turning of lamp 22 will automatically cause the bright light circuit to be energized as the washer 87 will cause the contact member 85 to engage the terminal 82.

Various changes can be made in the details of construction without departing from the spirit of my invention and the scope of the appended claims.

What I claim is:—

1. In combination with a vehicle, of a pair of incandescent headlamps secured to said vehicle and normally positioned to illuminate the space directly in advance thereof, one of said headlamps being movable in a substantially horizontal plane, means for moving said movable headlamp, an electrical circuit leading to each lamp, and a switch in the circuit leading to one of said lamps, said switch being operable by said headlamp moving means for controlling the circuit to one of said lamps, said switch including a multiplicity of contacts and a plunger operable by said headlamp moving means for engaging said contacts when the movable headlamp is in a predetermined position.

2. In combination with a vehicle, of a pair of incandescent head lamps secured to said vehicle and normally positioned to illuminate the space directly in advance thereof, one of said head lamps being movable in a substantially horizontal plane, means for moving said movable head lamp, an electrical circuit leading to each lamp, and a switch in the circuit leading to one of said lamps, said switch being operable by said head lamp moving means for controlling the circuit to one of said lamps, said switch including a multiplicity of contacts and a plunger operable by said head lamp moving means for engaging said contact when the movable head lamp is in a predetermined position, and means for automatically returning the lamp to normal position when said manually operated means is released.

In testimony whereof I hereunto affix my signature this 11th day of September 1924.

EDWARD E. RICHARDSON.